(12) United States Patent
Lovmand

(10) Patent No.: US 9,325,698 B2
(45) Date of Patent: Apr. 26, 2016

(54) METHOD AND APPARATUS FOR ON-SITE AUTHORISATION

(75) Inventor: Bo Lovmand, Hadsten (DK)

(73) Assignee: Vestas Wind Systems A/S, Aarhus N (DK)

( * ) Notice: Subject to any disclaimer, the term of this patent is extended or adjusted under 35 U.S.C. 154(b) by 111 days.

(21) Appl. No.: 13/978,364

(22) PCT Filed: Dec. 19, 2011

(86) PCT No.: PCT/DK2011/050498
§ 371 (c)(1),
(2), (4) Date: Jul. 11, 2013

(87) PCT Pub. No.: WO2012/092928
PCT Pub. Date: Jul. 12, 2012

(65) Prior Publication Data
US 2013/0290705 A1    Oct. 31, 2013

Related U.S. Application Data

(60) Provisional application No. 61/429,596, filed on Jan. 4, 2011.

(30) Foreign Application Priority Data

Jan. 4, 2011    (GB) .................................. 1100045.2

(51) Int. Cl.
*H04L 29/06*    (2006.01)
*G06F 21/33*    (2013.01)
(Continued)

(52) U.S. Cl.
CPC ............ *H04L 63/0823* (2013.01); *G06F 21/33* (2013.01); *G06F 21/335* (2013.01);
(Continued)

(58) Field of Classification Search
CPC ............ H04L 63/0823; H04L 63/8092; H04L 63/205; H04L 9/3268; G06F 21/33; G06F 21/335; G06F 21/62

USPC .......................................... 713/156, 169, 173
See application file for complete search history.

(56) References Cited

U.S. PATENT DOCUMENTS 6,981,145 B1    12/2005    Calvez et al.
7,231,371 B1 *    6/2007    Cantini et al. .................. 705/65
(Continued)

FOREIGN PATENT DOCUMENTS

EP    1780640 A1    5/2007
EP    2037651 A1    3/2009
(Continued)

OTHER PUBLICATIONS

International Search Report and Written Opinion, PCT/DK2011/050498, Mar. 29, 2012.
(Continued)

*Primary Examiner* — Haresh N Patel
(74) *Attorney, Agent, or Firm* — Patterson & Sheridan

(57) ABSTRACT

A method for authorization of a user to access a computer system locally at a site is described. The computer system determines whether a network connection to a remote authentication source is available. If the network connection is available, the computer system authenticates the user by interaction with the remote authentication source. If the network connection is not available, the computer system authenticates the user against a credential provided by the user. In this case, the credential will have been provided by or validated by the remote authentication source less than a predetermined time prior to the authenticating step, and the credential is a certificate issued by a certificate authority already trusted by the computer system and valid for a predetermined period of time. A suitable computer system is also described.

15 Claims, 4 Drawing Sheets

(51) Int. Cl.
  *G06F 21/62* (2013.01)
  *H04L 9/32* (2006.01)
(52) U.S. Cl.
  CPC .......... *G06F 21/62* (2013.01); *H04L 9/3268* (2013.01); *H04L 63/0892* (2013.01); *H04L 63/205* (2013.01); *Y04S 40/24* (2013.01)

(56) References Cited

U.S. PATENT DOCUMENTS

| | | | |
|---|---|---|---|
| 7,752,450 | B1 | 7/2010 | Palmer et al. |
| 7,770,204 | B2 * | 8/2010 | Pathakis et al. ............ 726/2 |
| 8,549,614 | B2 * | 10/2013 | Kumar et al. ............... 726/14 |
| 2004/0003190 | A1 | 1/2004 | Childs et al. |
| 2005/0283608 | A1 * | 12/2005 | Halcrow et al. ............ 713/175 |
| 2006/0206720 | A1 | 9/2006 | Harada et al. |
| 2008/0148046 | A1 * | 6/2008 | Glancey ..................... 713/156 |
| 2008/0155262 | A1 * | 6/2008 | Beaver et al. .............. 713/173 |
| 2009/0183254 | A1 | 7/2009 | Franco et al. |
| 2009/0281675 | A1 * | 11/2009 | Rasmussen et al. ........ 700/287 |
| 2010/0077213 | A1 * | 3/2010 | Xiao et al. .................. 713/169 |
| 2010/0077454 | A1 * | 3/2010 | Xiao et al. .................. 726/3 |
| 2010/0235912 | A1 * | 9/2010 | Hermann et al. ........... 726/23 |
| 2011/0191579 | A1 * | 8/2011 | Xiao et al. .................. 713/156 |
| 2011/0239271 | A1 * | 9/2011 | Xiao et al. .................. 726/1 |
| 2012/0005718 | A1 * | 1/2012 | Xiao et al. .................. 726/1 |

FOREIGN PATENT DOCUMENTS

| | | |
|---|---|---|
| WO | 2006/095879 A1 | 9/2006 |
| WO | 2007/036024 A1 | 4/2007 |
| WO | 2007/114866 A2 | 10/2007 |
| WO | 2008/070857 A1 | 6/2008 |

OTHER PUBLICATIONS

GB Search Report, GB1100045.2, May 17, 2011.

* cited by examiner

METHOD AND APPARATUS FOR ON-SITE AUTHORISATION

TECHNICAL FIELD

The invention relates to method and apparatus for providing on-site authorisation to computing resources. The invention has particular relevance to providing on-site authorisation to access for computing resources at a site remote from a central authorisation server and only intermittently in network communication with it. This is especially relevant to the provision of access to power generation facilities, and in particularly wind farms, which are typically constructed in locations where network access is difficult to provide continuously.

BACKGROUND TO THE INVENTION

Wind farms, and similar power generation facilities, are frequently controlled and monitored remotely. Systems providing such supervisory control and monitoring are generally referred to as SCADA (supervisory control and data acquisition) systems—these involve a central system which provides high level supervision and control, but rely on local implementation of control and monitoring processes. These are performed by local systems at the relevant site—for example, at an individual wind "park".

Authorisation and access control may be achieved conventionally without difficulty where all control is mediated effectively through a central server. A conventional AAA (authentication, authorization and accounting) server or similar functionality may be used at the central site, and access control of whatever type is required can be used to allow access to SCADA control of individual parks. This may allow whatever mixture of permissions can be provided in conventional systems (for instance, to allow control to the customer, but to allow access to maintenance functions to a park provider and maintenance access to individual engineers).

In some situations, local access to systems will be required. This may be needed for on-site maintenance, or during the construction of the park. Given the remote location of many wind parks and their inherent challenges for network access (high winds will typically disrupt radio communication, for example), authorisation through a central server will frequently be problematic. Conventional authorisation solutions can be used, but are problematic. A conventional approach would involve allowing a remote location to authenticate on the basis of certificates provided by a trusted Certification Authority, which allows for local authentication and hence authorisation without network access provided that the local site has sufficient confidence that the certificates that it checks are still valid. This can be done by regular receipt of CRLs (Certificate Revocation Lists) from the Certification Authority so that certificates that are no longer valid can be identified.

This approach requires regular network traffic to provide satisfactory confidence that all certificates are valid, and so may be problematic if network connectivity is lost for a significant length of time (which may be particularly likely if maintenance is required). Moreover, in many jurisdictions, security requirements for power plants require there to be a centrally managed list of personnel authorized to access plant assets with an associated list of allowed operations for each identified person. Such requirements may require, as is the case in those made by the North American Electric Reliability Corporation (NERC), which is responsible for reliability standards for the North American grid, that it be possible to change and/or revoke permissions and demonstrate that this has been done within a 24 hour period. This is particularly challenging to achieve for remote assets with intermittent network access without inhibiting necessary maintenance access.

While this problem is considered here particularly in the power plant management domain, issues of local authentication and authorisation may arise in many other domains, and solutions may thus be applicable in other technical and commercial areas.

SUMMARY OF THE INVENTION

According to one aspect of the present invention, there is provided a method for authorisation of a user to access a computer system locally at a site, the method comprising: the computer system determining whether a network connection to a remote authentication source is available; if the network connection is available, the computer system authenticating the user by interaction with the remote authentication source; if the network connection is not available, the computer system authenticating the user against a credential provided by the user, wherein the credential is a certificate issued by a certificate authority already trusted by the computer system and valid for a predetermined period of time.

This approach allows for effective authorisation of a local user, combining security and practicality. A high level of security is achieved if the credential has been provided by or validated by the remote authentication source less than a predetermined time prior to the authenticating step, particularly where the predetermined time is 24 hours or less. This allows compliance with audit requirements (such as NERC requirements) which require control over user access permissions to be met over such a timescale to be achieved. This can be achieved by use of certificates with periods of validity of the predetermined time (or less).

Preferably, if the network connection is available, the computer system authenticates the user both by interaction with the remote authentication source and against the credential provided by the user.

In a preferred arrangement, the computer system authorises a user to access resources at the site on the basis of the user credential. In such a case, if the computer system also holds one or more certificates issued by the certificate authority relating to permissions for resources at the site, access to specific resources may be permitted if this is allowed by both the user credential and the one or more certificates held by the computer system.

This allows for a simple and efficient system to be developed for access to resources at the site. It is particularly effective for implementation of role-based access control—preferably, the user credential indicates a user role, and access to resources is allowed by the computer system consistent with that user role.

A method of controlling access to a power generation facility, wherein access comprises monitoring, controlling, or both monitoring and controlling operation of the power generation facility, may use such an approach. Such a method may comprise authorising a user to access a computer system of the power generation facility by the methods set out above, and allowing access to the user when authorised. This is especially true where the power generation facility is a wind park, as this allows for appropriate monitoring and control by both the customer and the service provider who has established and managed the park. In such a case, the computer system may be a SCADA server of the wind park, or may even be comprised within a wind turbine of the wind park.

In a further aspect, the invention provides a computer system adapted to authorise local access of a user at a site, wherein the computer system is adapted to determine whether a network connection to a remote authentication source is available; whereby if the network connection is available, the computer system authenticates the user by interaction with the remote authentication source; and whereby if the network connection is not available, the computer system authenticates the user against a credential provided by the user, wherein the credential is a certificate issued by a certificate authority already trusted by the computer system and valid for a predetermined period of time.

Advantageously, the computer system authorises a user to access resources at the site on the basis of the user credential, and preferably, the user credential is a certificate issued by or on behalf of a certificate authority trusted by the computer system, and the computer system holds one or more certificates issued by the certificate authority relating to permissions for resources at the site, and wherein access to specific resources is permitted if this is allowed by both the user credential and the one or more certificates held by the computer system.

A power generation facility may comprise a wind park and a computer system as set out above for controlling access to the wind park, wherein access comprises monitoring, controlling, or both monitoring and controlling operation of the wind park. The computer system described above may then be a SCADA server of the wind park, or may be comprised within a wind turbine.

In a further aspect, the invention provides a method for a user to obtain access to a trust domain, wherein the trust domain comprises a computer system accessed locally at a site and an authentication source remote from the computer system, the method comprising: the user accessing the trust domain by interaction with the authentication source and receiving a certificate issued by a certificate authority already trusted by the computer system and valid for a predetermined period of time; the user subsequently attempting to access the computer system locally at the site, and if there is no network connection at the site, providing the certificate as a credential for authentication for the user to obtain access to the computer system.

Preferably, on every access to the trust domain by interaction with the authentication source the user receives a new certificate valid for a predetermined period of time. This predetermined time may be 24 hours or less.

BRIEF DESCRIPTION OF THE DRAWINGS

The invention will now be described, by way of example only, by reference to the following drawings in which.

DETAILED DESCRIPTION OF PREFERRED EMBODIMENTS

Figure 1:
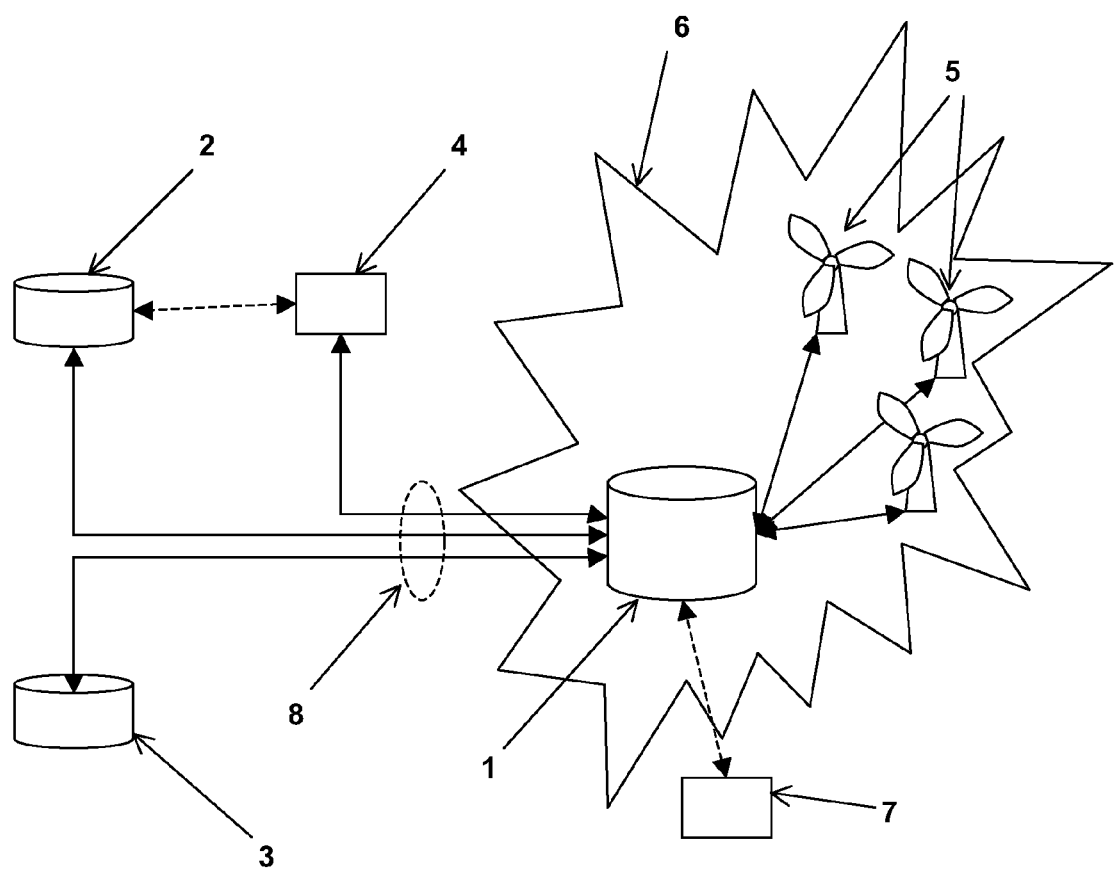
FIG. 1 shows the elements of a wind park control system in which embodiments of the invention can be used.

FIG. 1 shows the elements of a wind park controlled using SCADA. In this case, the wind park was established by a service provider (typically the manufacturer and installer of the wind park) but is operated by a customer, with the service provider retaining certain responsibilities such as maintenance. This means that access to park assets is required by the customer, the service provider, and in particular by named employees of the service provider required to conduct on-site maintenance.

FIG. 1 shows that a wind park 6 contains a number of wind turbines 5 under the control of a SCADA server 1. In practice, access to the SCADA server 1 will generally be made remotely from a service provider server 2 or from a customer server 3, or perhaps directly by a suitably authorised person such as a service provider technician, shown here as connecting to the SCADA server 1 through technician client computer 4. Such clients will need to obtain credentials or some other verifiable permission from a root of trust—shown here as accessed through the service provider server 2—so that they can be authenticated and hence authorised by the SCADA server 1. In situations of interest, the network access to the park (shown as 8) will be intermittent, rendering it impossible to guarantee that the SCADA server 1 can interact with the service provider server 2 or the customer server 3 directly. A particular situation of interest is where a technician, here shown by local access client 7, requires access to wind park resources controlled by the SCADA server 1 when network access 8 to the wind park 6 is unavailable.

Figure 2:
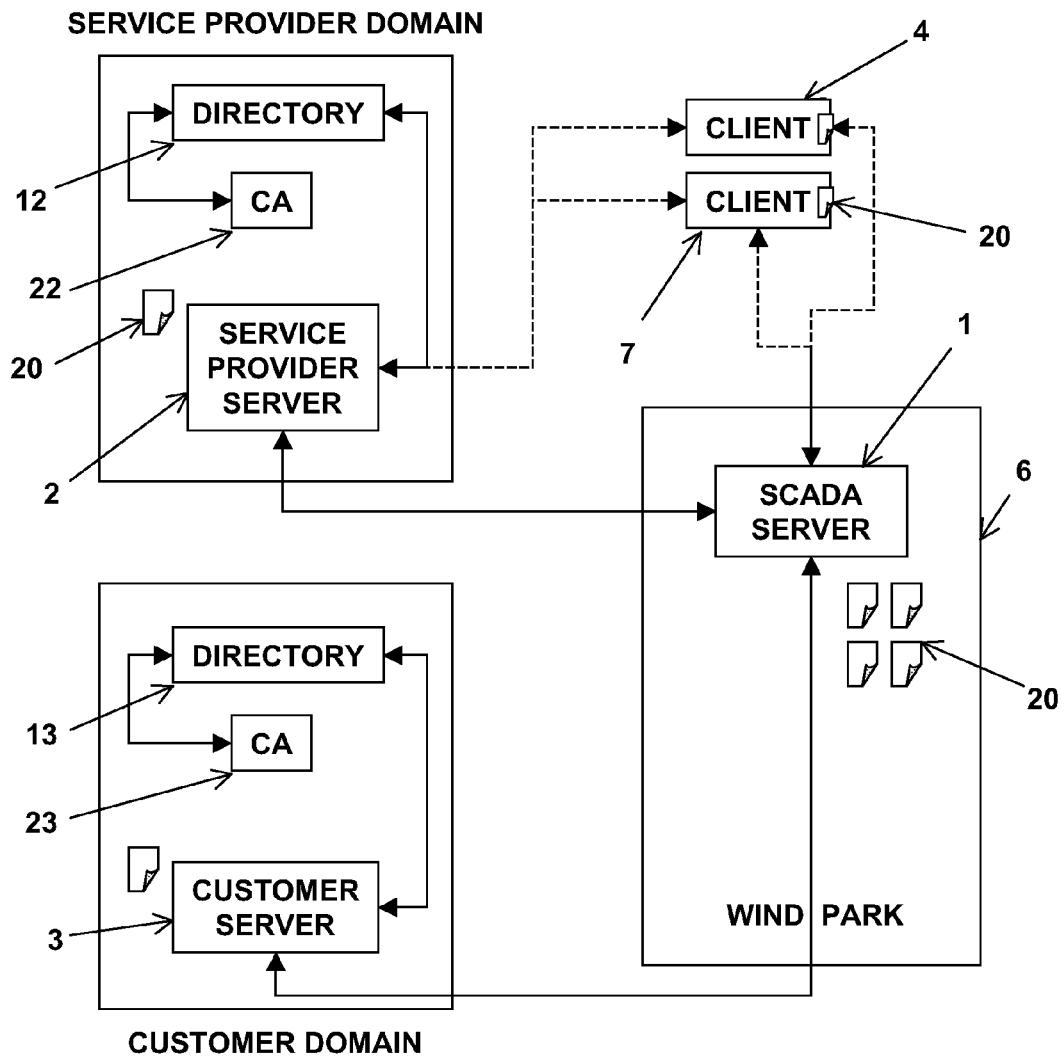
FIG. 2 illustrates the use of Certification Authorities in authorisation for the system of FIG. 1.

The basic trust relationship between the different elements is shown in FIG. 2. Trust relationships are established with reference to one or more Certificate Authorities (CA). These provide the root of trust for authentication and hence authorisation for access to facilities through the SCADA server 1. In the arrangement shown, the service provider server 2 has a service provider CA 22 and the customer server 3 has a customer CA 23 within their respective domains, though trusted third party CAs could also be used. Certificates 20 are issued by, or authority to issue them is delegated by, these CAs to provide credentials used in authentication and used for authorisation by the SCADA server 1. Certificates may be, for example, conventional X.509 certificates issued under the X.509 system (as set out, for example, in RFC 5280 produced by the IETF).

The set of certificates produced will depend on the desired chain of trust, and on the individual entities that need to control or be controlled. In the case of the wind park shown in FIG. 1, the service provider 2 may have one main certificate (possibly with several additional certificates for different business functions), and the customer 3 will similarly have at least one main certificate. There may be multiple "main" certificates with different CAs. Individuals granted rights to access the park in some way—such as service provider technicians—will have their own certificates with some subset of the permissions allowed to the party granting them this access. The park itself (here embodied by SCADA server 1) has its own certificate showing its identity, together with one or more Park Access Certificates (PACs) for each CA able to grant permissions for park access, which will then be used by the SCADA server 1 to complete the authorisation process. These PACs (which may for example be related to the customer, or the service provider, or some subset of the employees or agents of either) will be installed securely in the park—this may be done on initial commissioning of the park, or subsequently under the authority of a specific CA designated for the purpose—this CA would need to hold an appropriate certificate for this purpose. If control is determined at the level of individual wind turbines (rather than, or as well as, at the SCADA server 1) then these also require identity and PAC certificates.

These certificates will typically be issued to individual users, and will indicate both the specific permissions that those users have been given and who has granted these permissions. In this way, a certificate will provide not only a set of permissions but also a hierarchy of trust associated with these permissions. These certificates may indicate assigned user roles, and be used as part of a system of Role Based Access Control (RBAC). RBAC need not be used in all embodiments of the present invention and described embodiments are not limited to any specific RBAC mechanism—as the person skilled in the art will appreciate, any suitable RBAC system may be used in the embodiments described, and embodiments of the invention can be used without use of any form of RBAC. Permissions associated with roles may include full control (as may be needed by a technician carrying out a significant maintenance operation), limited control (as may be required by a technician carrying out routine maintenance), view/read access (required for monitoring) or customer access (enabling a limited set of control and monitoring operations).

Individual users may operate within, or have access to, a trust domain managed by a directory service—this may be for example an implementation of Microsoft Active Directory. In the arrangement shown, the service provider server 2 has a service provider directory 12 and the customer server 3 has a customer directory 13. As is shown in FIG. 2, technician client computer 4 has access to the service provider trust domain through the service provider directory 12. The service provider directory 12 can thus authenticate the technician client computer 4 and can provide it with certificates as required when satisfactorily authenticated. When in network communication with the service provider directory 12, local access client 7 (assuming that it is also part of the service provider trust domain) can also be authenticated by the service provider directory 12 and provided with certificates by it. Again, this can be carried out by conventional procedures such as those employed in standard implementations of Microsoft Active Directory.

Provision of certificates, and authentication and authorisation information exchanges, should take place in such a way as to ensure that the information exchanged is secure. If both parties are within a secure domain—for example, if both parties and the connection between them are all within the same firewall—it may not be necessary for communication between the parties to be encrypted. If messages need to travel on a public network, it will be desirable for some form of encryption to be used, such as that provided by TLS (Transport Layer Security) or SSL (Secure Sockets Layer). The skilled person will appreciate that conventional approaches may be used to implement TLS (for example, according to the processes set out in RFC 5246, which sets out version 1.2 of the TLS protocol), and that embodiments of the invention as described below do not rely on or require any specific approach to providing secure communication between elements of the system shown in FIG. 1. To implement the provision of a secure channel using TLS, the different parties involved in establishing a channel will need to be able to sign messages with their own private key, and to make their corresponding public key available to be used by the other party.

As previously indicated, authorisation requires an exchange of certificates. Certificates for the park resources and the SCADA server 1 will generally have been provided on construction of the park (or at a later date by the park service provider)—by whatever mechanism, these will have been installed in the SCADA server 1 or in another relevant park resource in such a wa as to provide an acceptable level of security (for example, that mandated by NERC). As described above, certificates that can be used to obtain access to park resources are here termed Park Access Certificates (PACs)—a set of PACs will be provided for the park for use by the SCADA server 1 in authentication and authorisation. A client certificate will generally have been provided by, or on authority delegated by, a relevant CA for that client which has been provided with a PAC—this CA will thus be one recognised by the SCADA server 1 and hence by park resources as a CA with authority to provide permissions relating to park resources.

Certificates may be used both in the establishment of a secure connection between a remote client or server and the SCADA server 1 and in the authorisation process. These roles are indicated in FIGS. 3A and 3B respectively.

Figure 3A:
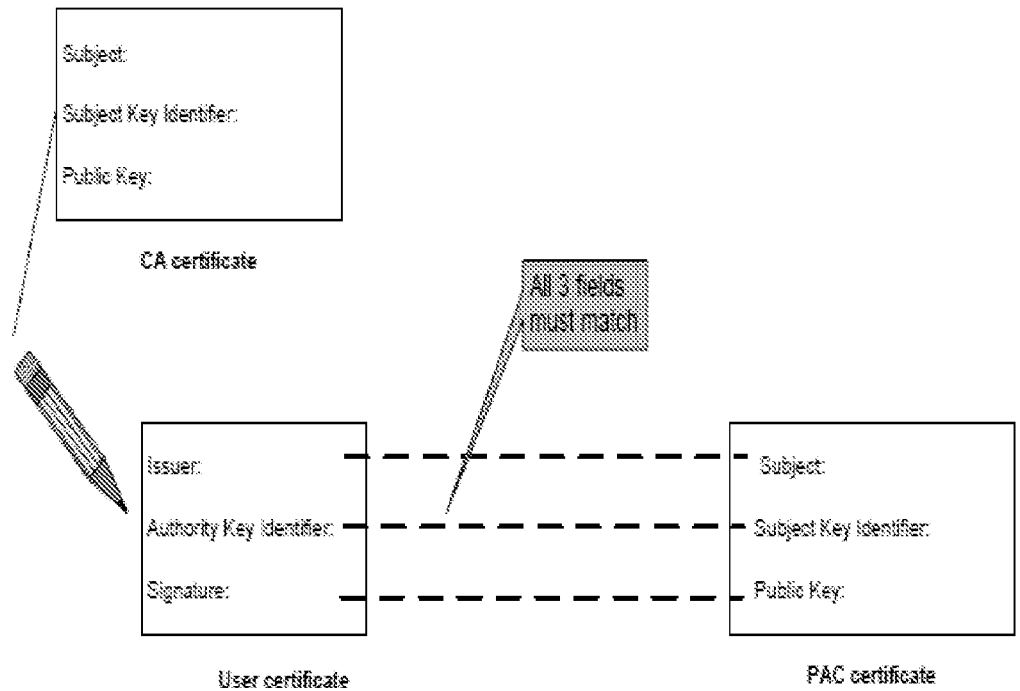
FIGS. 3A and 3B illustrates use of certificates in authorisation in the system of FIG. 1.
Figure 3B:
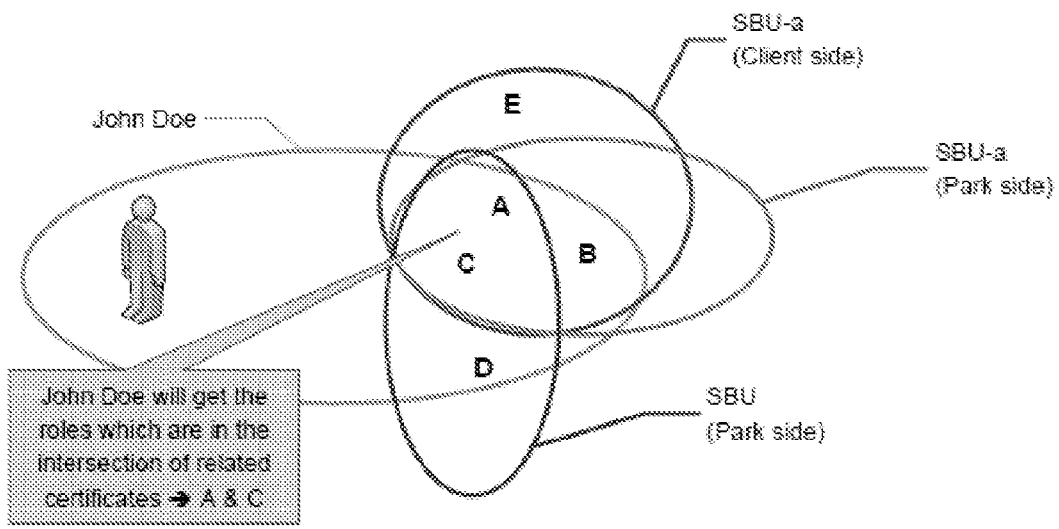

FIG. 3A shows the use of certificates in establishing a secure remote connection. The SCADA server 1 is adapted not to accept a remote connection unless there is a satisfactory match between a PAC certificate in its collection and the client certificate provided to it. In the example shown, the required match is between the following:

"Authority Key Identifier" for the client and "Subject Key Identifier" for the PAC;

the key used to sign the client certificate and the public key of the PAC certificate; and "Issuer" for the client and "Subject" for the PAC certificate.

Once a secure connection is established, authorisation can take place. At this point, it has been established that the client/server seeking access to park resources has a CA trusted by the park. It is then necessary to determine which permissions the client/server seeking access has, and so what park resources can be accessed. FIG. 3B indicates the position for a user who has a permission through a particular certificate path. The permissions allowed are those provided by the overlap of all certificates in the path—in the case shown here, the user will have permissions for roles A and C, as these are provided by all certificates in the path. These permissions may correspond to different roles of an RBAC system. If a user requires a different role, it is possible that this may be achievable by using a different client certificate, as this may lead to a different set of permissions.

The approach described above is appropriate for remote access to a SCADA server 1. For local access to a SCADA server 1, at least two different types of approach to authorisation may be used to authorise a local client trying to access the park resources that it controls: one approach requires network connectivity, whereas in the other approach authorisation can be carried out without network connectivity. Both involve the use of certificates from each party (the party seeking access, and the party providing access) as a part of the authorisation process essentially as described above.

In either case, a practical issue is that of whether a certificate issued to a client is still valid, or has subsequently been revoked—this may be particularly relevant for certificates related specifically to provision of access to park resources, which will need to stay consistent with the role and status of individual users. In an approach where there is network connectivity available, validity can be determined at the time of authorisation—as a part of the authorisation process the SCADA server 1 can request information on certificate validity. This may be provided by Certificate Revocation Lists (CRLs) issued by the CAs, which may be made publicly available by the CAs at regular intervals, or may be requested by an online enquiry using Online Certificate Status Protocol (OCSP) as described in RFC 2560 produced by the IETF. In OCSP, the SCADA server 1 can enquire about certificate status directly to an OCSP server acting for the relevant CA.

Where there is no network connectivity, the SCADA server 1 will need to rely on data already received. These may include CRLs already provided by the CAs, which may be obtained by the SCADA server 1 regularly when network connectivity exists. Other requirements of the system—establishing that a certificate was validly issued and associated client permissions—can be established directly between the SCADA server 1 and the local client 7 without the need for network connectivity on the basis of keys and certificates held by the two parties.

A difficulty with this approach is that if the SCADA server 1 has been offline for a significant period, then the risk becomes significant that the client certificate may have been revoked. This may also lead to a breach of security requirements, such as the cyber security standards set down by the North American Electric Reliability Corporation (NERC), which mandate that it be possible to change and/or revoke permissions and demonstrate that this has been done within a 24 hour period.

Figure 4:
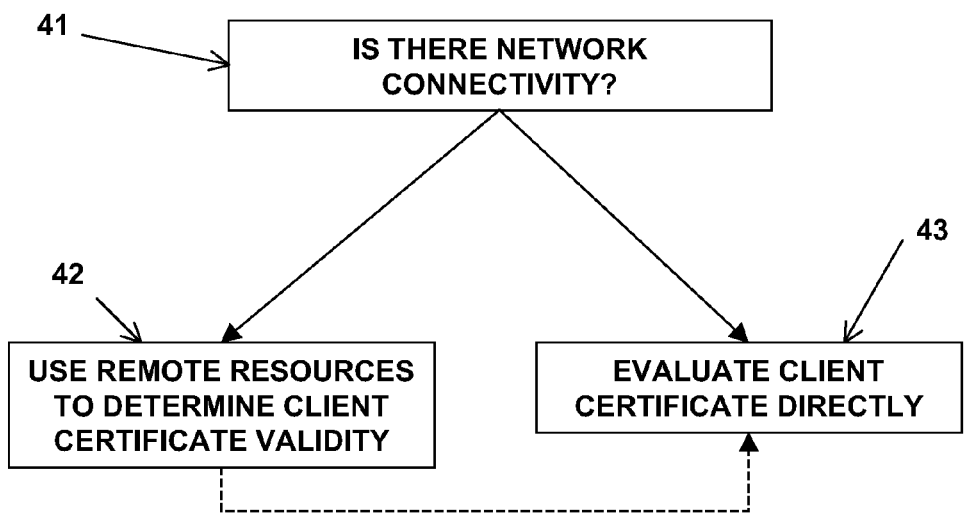
FIG. 4 illustrates schematically a method of on-site authorisation according to one embodiment of the invention and suitable for use in the system of FIG. 1.

FIG. 4 indicates an approach to providing on-site authorisation according to an embodiment of the invention. A local client 7 seeks access to a SCADA server 1. First of all, the SCADA server 1 tries to establish (step 41) whether there is network connectivity, which will allow it to use remote resources (such as an OCSP server acting for a CA) in the authorisation process. If there is network connectivity, remote resources are used (step 42) to determine whether the local client certificate is currently valid (failure to establish validity will result in denial of access and a log of the failed attempt). If there is no network connectivity, direct evaluation of the local client certificate (step 43) is used to determine whether to allow the local client 7 access to park resources. If there is network connectivity, direct evaluation of the local client certificate and use of remote resources may be used together in the authorisation decision.

The remote resources may not necessarily be an OCSP server. One solution where there is network connectivity is for the local client 7 to log in to the trust domain (provide username and password, for example) in the normal manner. In this way the status of the user is checked directly to ensure that he or she is still a part of the trust domain.

In order to provide a high level of security for this solution, the local client certificate is valid only for a short duration. Typically an X.509 certificate will have a defined period of validity, but this will typically be months or years. Providing short periods of validity would generally be seen as highly disadvantageous, as it would require regular replacement of certificates. A short period of validity may however be used advantageously in this arrangement, as it allows compliance with security requirements—if it is necessary to show that permissions can be demonstrably revoked or changed within 24 hours, issuance of certificates with a 24 hour or shorter duration (for example, 12 hours, which may be practical to allow a technician a working day at the site) provides immediate evidence of compliance. As the certification authority is already trusted by the SCADA server 1, this approach allows a user to be given authorised access to site resources even when the SCADA server 1 has had no network connectivity from before the certificate was issued to the user.

Figure 5:
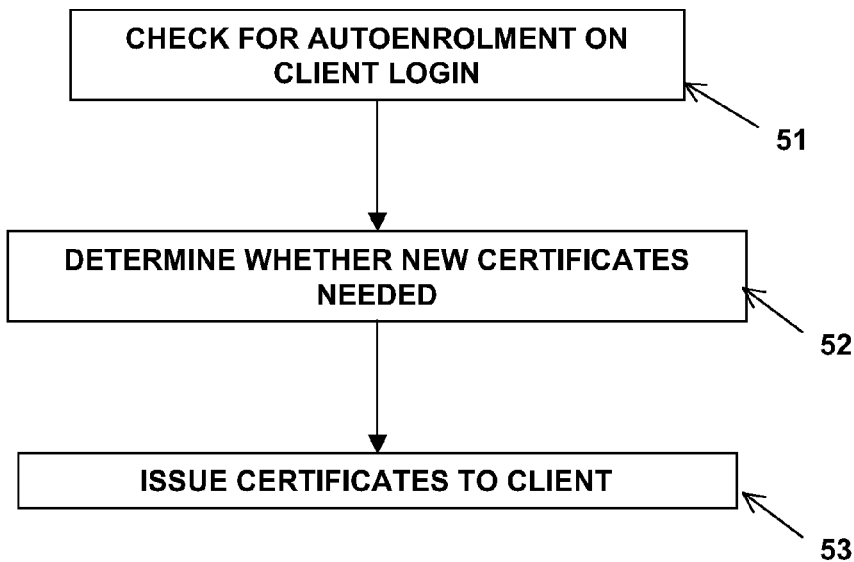
FIG. 5 illustrates schematically a system for certificate renewal for use by individual users of the system of FIG. 1.

While this solution appears to create an additional burden in the need to reissue certificates, this can be addressed effectively by establishing an automated enrolling process to ensure that certificates are regularly issued to relevant users. Such a process is indicated in FIG. 5.

The process is carried out when the user logs in to the directory service of the relevant trust domain. On log in (step 51), the trust domain determines whether the user is automatically enrolled to a process of certificate replacement for one or more certificates issued by its associated CA (step 52) or if new certificates should be issued for that user role. A certificate template should be available for each type of certificate requiring issue or replacement, so the system burden in generating frequent new certificates would be small. Certificates may be renewed even if currently valid and active, to ensure that the user will have use of the certificate for the full certificate lifetime from log in (reducing the risk that the user will be deprived of access by unexpected certificate expiration). If the user is automatically enrolled, the replacement or new certificates are issued (possibly by request to the CA—in practice the normal approach will be for authority for such certificates to have been delegated by the CA to the relevant directory service) to the user (step 53). The newly issued certificates can then be used for local access to the SCADA server 1 as a local access client 7, and use of the certificates can be logged at the SCADA server 1 (typically by recording a hash of a relevant certificate value with a log of associated park activity).

A technician seeking to access the SCADA server 1 locally would therefore generally log in to his trust domain before travelling to the park itself and obtain a certificate valid for the duration of the visit. Access to park resources through the SCADA server 1 would thus be achievable whether or not there was network connectivity to the SCADA server 1.

While embodiments described here relate to access to the SCADA server 1, this approach does not rely on the presence of a SCADA server at the park. Alternatively, this approach could be used to access wind turbines directly. If this was to be done, individual wind turbines would require the same facilities as are here indicated as available to the SCADA server (a private key, PAC certificates relating to appropriate park resources, which in this case may relate only to that wind turbine).

The approach described here should be used in accordance with appropriate security mechanisms to keep secrets sufficiently secure. This may be done according to known approaches: a private key of a server or client computer may be stored within a Trusted Platform Module (TPM), whereas a private key of an inaccessable structure such as a wind turbine may be simply stored in a part of the turbine difficult to access physically.

As is described above, aspects of the invention as described and claimed here are advantageous to allow reliable and secure authorisation to resources at a site even when network connectivity to the site is intermittent at best.

The invention claimed is:

1. A method for authorisation of a user to access a computer system locally at a power generation facility, the method comprising:
the computer system determining whether a network connection to a remote authentication source is available;
if the network connection is available, the computer system authenticating the user by interaction with the remote authentication source;
if the network connection is not available, the computer system authenticating the user against a credential provided by the user, wherein the credential is a certificate issued by a certificate authority already trusted by the computer system and valid for a predetermined period of time, wherein the credential has been provided to the user by, or validated by the remote authentication source, less than a predetermined time prior to attempting to authenticate the user, and wherein the predetermined period of time is selected to comply with a regulatory requirement for revoking access to the computer system by the user following the user's authorization to access the computer system being revoked.

2. The method of claim 1, wherein the predetermined time is 24 hours or less.

3. The method of claim 1, wherein if the network connection is available, the computer system authenticates the user both by interaction with the remote authentication source and against the credential provided by the user.

4. The method of claim 1, wherein the computer system authorises the user to access resources at the power generation facility on the basis of the user credential.

5. The method of claim 4, wherein the computer system holds one or more certificates issued by the certificate authority relating to permissions for resources at the power generation facility, and wherein access to specific resources is permitted if this is allowed by both the user credential and the one or more certificates held by the computer system.

6. The method of claim 4, wherein the user credential indicates a user role, and access to resources is allowed by the computer system consistent with that user role.

7. The method of claim 1 wherein the power generation facility is a wind park.

8. The method of claim 7, wherein the computer system is a SCADA server of the wind park.

9. The method of claim 7, wherein the computer system is comprised within a wind turbine of the wind park.

10. A computer system adapted to authorise local access of a user at a site, wherein the computer system comprises:
one or more processors programmed to determine whether a network connection to a remote authentication source is available; whereby if the network connection is available, the computer system authenticates the user by interaction with the remote authentication source; and whereby if the network connection is not available, the computer system authenticates the user against a credential provided by the user, wherein the credential is a certificate issued by a certificate authority already trusted by the computer system and valid for a predetermined period of time, wherein the credential has been provided to the user by, or validated by the remote authentication source, less than a predetermined time prior to attempting to authenticate the user, and wherein the predetermined period of time is selected to comply with a regulatory requirement for revoking access to the computer system by the user following the user's authorization to access the computer system being revoked.

11. The computer system of claim 10, wherein the computer system authorises a user to access resources at the site on the basis of the user credential.

12. The computer system of claim 11, wherein the computer system holds one or more certificates issued by the certificate authority relating to permissions for resources at the site, and wherein access to specific resources is permitted if this is allowed by both the user credential and the one or more certificates held by the computer system.

13. A power generation facility comprising:
a wind park; and
a computer system, for controlling access to the wind park, wherein access comprises monitoring, controlling, or both monitoring and controlling operation of the wind park; wherein the computer system comprises:
one or more processors programmed to determine whether a network connection to a remote authentication source is available; whereby if the network connection is available, the computer system authenticates the user by interaction with the remote authentication source; and whereby if the network connection is not available, the computer system authenticates the user against a credential provided by the user, wherein the credential is a certificate issued by a certificate authority already trusted by the computer system and valid for a predetermined period of time, wherein the credential has been provided to the user by, or validated by the remote authentication source, less than a predetermined time prior to attempting to authenticate the user, and wherein the predetermined period of time is selected to comply with a regulatory requirement for revoking access to the computer system by the user following the user's authorization to access the computer system being revoked.

14. The power generation facility of claim 13, wherein the computer system is a SCADA server of the wind park.

15. The power generation facility of claim 13 comprising one or more wind turbines each comprising a computer system as claimed in claim 10.

* * * * *